United States Patent
Cahill et al.

(10) Patent No.: US 9,667,791 B2
(45) Date of Patent: May 30, 2017

(54) METHOD AND APPARATUS FOR PROVIDING COMMUNICATION INTERACTION VISIBILITY

(71) Applicant: Webtext Holdings Limited, Dublin (IE)

(72) Inventors: Anthony Cahill, County Galway (IE); Colm Keating, Dublin (IE)

(73) Assignee: Webtext Holdings Limited (IE)

( * ) Notice: Subject to any disclaimer, the term of this patent is extended or adjusted under 35 U.S.C. 154(b) by 1 day.

(21) Appl. No.: 14/696,445

(22) Filed: Apr. 26, 2015

(65) Prior Publication Data

US 2015/0312412 A1    Oct. 29, 2015

Related U.S. Application Data

(60) Provisional application No. 61/984,838, filed on Apr. 27, 2014.

(51) Int. Cl.
*H04M 3/00* (2006.01)
*H04M 5/00* (2006.01)
*H04M 3/51* (2006.01)

(52) U.S. Cl.
CPC ................................ *H04M 3/5191* (2013.01)

(58) Field of Classification Search
CPC .................................................. H04M 3/5133
USPC ...... 379/265.01–265.14, 266.01–265.1, 309, 379/203.01
See application file for complete search history.

(56) References Cited

U.S. PATENT DOCUMENTS

| | | | | |
|---|---|---|---|---|
| 5,706,211 | A * | 1/1998 | Beletic | H04W 88/185 340/7.1 |
| 7,584,244 | B2 * | 9/2009 | Forstadius | H04L 12/587 455/414.2 |
| 2002/0138340 | A1 * | 9/2002 | Ikezawa | G06Q 10/06311 705/7.15 |
| 2003/0153302 | A1 * | 8/2003 | Lewis | G06Q 20/102 455/412.1 |
| 2003/0174829 | A1 | 9/2003 | Dezonno et al. | |
| 2005/0129212 | A1 | 6/2005 | Parker | |
| 2005/0163299 | A1 * | 7/2005 | Creamer | H04M 3/42042 379/142.06 |
| 2006/0047615 | A1 * | 3/2006 | Ravin | G06N 5/022 706/50 |
| 2006/0251233 | A1 * | 11/2006 | Mott | H04M 3/51 379/203.01 |
| 2008/0118052 | A1 * | 5/2008 | Houmaidi | H04M 3/5232 379/265.11 |

(Continued)

OTHER PUBLICATIONS

International Search Report and Written Opinion received for International Patent Application PCT/IB2015/053031, dated Sep. 7, 2015, 9 pages.

*Primary Examiner* — William Deane, Jr.
(74) *Attorney, Agent, or Firm* — Tarolli, Sundheim, Covell & Tummino LLP

(57) ABSTRACT

A method for providing communication interaction visibility includes detecting an incoming voice call communication to a communication system, determining an identifier of a caller initiating the voice call communication, retrieving a communication history related to the identifier from a messaging gateway, and providing the communication history to an agent terminal of the communication system.

36 Claims, 5 Drawing Sheets

(56) References Cited

U.S. PATENT DOCUMENTS

| | | | |
|---|---|---|---|
| 2009/0041217 A1* | 2/2009 | Balk | H04L 12/5885 379/93.01 |
| 2010/0329435 A1 | 12/2010 | Yasrebi et al. | |
| 2012/0135717 A1* | 5/2012 | Fiedorowicz | H04L 12/1818 455/414.1 |
| 2013/0124211 A1* | 5/2013 | McDonough | H04L 12/5895 704/275 |
| 2013/0185254 A1* | 7/2013 | Patron | G06Q 20/102 707/610 |
| 2013/0339877 A1* | 12/2013 | Skeen | G06F 3/0484 715/753 |
| 2014/0066111 A1* | 3/2014 | Lin | H04L 12/585 455/466 |
| 2015/0237486 A1* | 8/2015 | Lauder | H04W 4/14 455/466 |
| 2016/0100047 A1* | 4/2016 | Poon | H04W 24/04 455/425 |

\* cited by examiner

METHOD AND APPARATUS FOR PROVIDING COMMUNICATION INTERACTION VISIBILITY

FIELD

The presently disclosed embodiments relate to messaging and communications, including providing improved visibility of communications among a caller, a contact center and a business.

BACKGROUND

A business may use a contact center to provide product information and support for customers and others, collectively referred to as a caller, or callers, who may communicate with the contact center. In some instances, a caller may have had previous communications with the contact center and other parties associated with the business before communicating again with the contact center. Contact center agents may have no access to or visibility of any communications that may have been previously exchanged between callers and the business or between callers and the contact center. Without this visibility an agent may be "blind" to previous communications, including commitments, troubleshooting procedures, customer data or other information that may have been exchanged between the business or the contact center and a caller. Currently, providing access to the communications may require allowing the contact center to have remote access to the business system via a user interface, or granting the contact center access to the business system though an Application Programming Interface (API).

Both of the methods above are dependent on access to the business systems directly. This may require both a technical integration and security approval from the business. In many instances this integration and security approval may be cost prohibitive, impractical, impossible, or otherwise undesirable and therefore not forthcoming. In addition, the customer identifier may not be known, or it may not be possible to identify the communications between the business system and a particular caller.

SUMMARY

It would be advantageous for a contact center agent to have full visibility of all communications exchanged between the business system and the caller and between the contact center and the caller. It would also be advantageous if these communications were available to the contact center agent on demand, in real-time, easily retrievable and available for a particular caller, for example, by using a unique caller identifier.

In at least one aspect, the messages sent between the business system and the caller and the contact center and the caller may share the same gateway, allowing the contact center to be provided with visibility of all messages between the customer and both the business system and contact center. These messages may be retrieved based on a customer identifier and the retrieval may be either manual or dynamic. This removes the need for any integration between the business system and contact center and removes the need for security approval as the retrieval happens after the messages have left the business system.

In at least one embodiment, a method for providing communication interaction visibility includes detecting an incoming voice call communication to a communication system, determining an identifier of a caller initiating the voice call communication, retrieving a communication history related to the identifier from a messaging gateway, and providing the communication history to an agent terminal of the communication system.

According to the disclosed embodiments, the identifier of the caller is determined automatically.

Also according to the disclosed embodiments, the identifier is determined from one or more of a calling line identification, calling number identification, automatic number identification, or a line identification database.

Further according to the disclosed embodiments, the messaging gateway stores the communication history comprising communications related to the identifier exchanged between the caller and a business system and a contact center system of the communication system.

Still further according to the disclosed embodiments, the caller is routed to an agent upon detecting the incoming voice call communication.

In addition, according to the disclosed embodiments, the communication history is rendered for viewing by the agent.

In further embodiments, the communication history related to the identifier includes text messages.

Some embodiments may include a computer program product including non-transitory computer program instructions that when executed by a processor cause the processor to perform the techniques and methods disclosed herein.

In one or more embodiments, a communication system for providing communication interaction visibility includes a contact center system for detecting an incoming voice call communication, and a communication sharing module that is configured to determine an identifier of a caller initiating the voice call communication, retrieve a communication history related to the identifier from a messaging gateway, and provide the communication history related to the identifier to an agent terminal.

According to the disclosed embodiments, the communication sharing module is configured to determine the identifier of the caller automatically.

Also according to the disclosed embodiments, the identifier is determined from one or more of a calling line identification, calling number identification, automatic number identification, or a line identification database.

Further according to the disclosed embodiments, the messaging gateway stores the communication history comprising communications related to the identifier exchanged between the caller and the contact center and a business system of the communication system.

Still further according to the disclosed embodiments, the contact center system is configured to route the caller to an agent upon detecting the incoming voice call communication.

In addition, according to the disclosed embodiments, the communication sharing module is configured to render the communication history for viewing by the agent.

In further embodiments, the communication history related to the identifier comprises text messages.

BRIEF DESCRIPTION OF THE DRAWINGS

Further aspects, details, advantages and modifications of the disclosed embodiments will become apparent from the following detailed description which is to be taken in conjunction with the accompanying drawings, in which.

DETAILED DESCRIPTION

Figure 1:
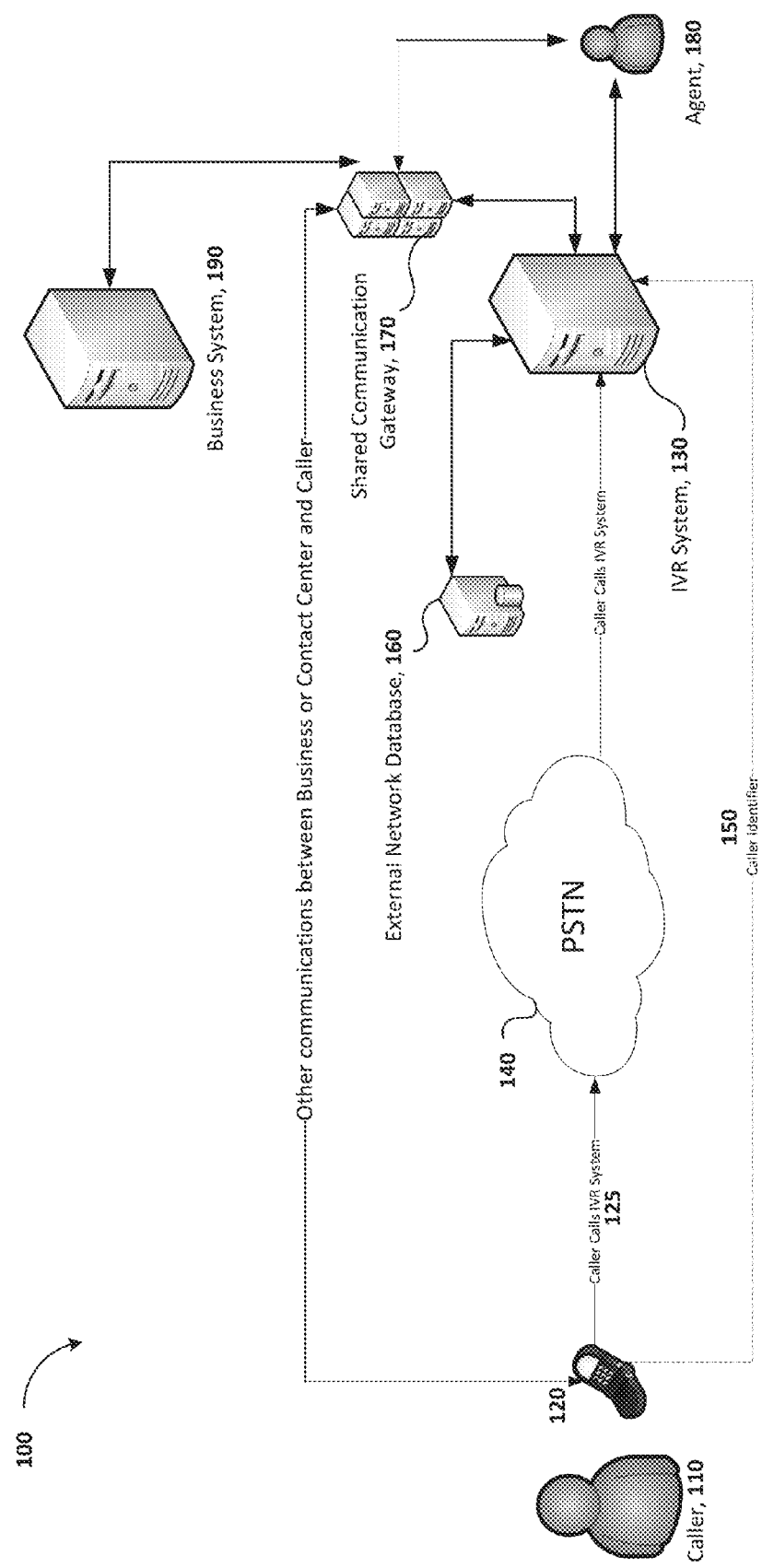
FIG. 1 shows an illustration of an exemplary process for communication sharing according to the disclosed embodiments.

FIG. 1 pictorially depicts an exemplary process 100 for communication sharing in a communication system, including for example, a business system 190 and a contact center system 130 with an Interactive Voice Response (IVR) data processing system. The disclosed embodiments include a shared communication gateway 170 connected to the business system 190 and the contact center system 130 which provides a central location where communications among the caller 110, the business system 190, and the contact center 130 may be stored.

As shown in FIG. 1, a caller 110 using a calling device 120 that is enabled at least for voice calling may establish a telephone call 125 with the contact center system 130 over the Public Switched Telephone Network (PSTN) 140 or other suitable network. In at least one embodiment, the call 125 may be routed directly to an agent 180. In other embodiments, the call 125 may be placed in queue and subsequently routed to the agent 180. The caller 110 may have already participated in previous communications, for example, text messages or email, between the contact center system 130 or business system 190 or both.

In at least one example, the caller may be calling to discuss a previous communication. A caller or calling device identifier 150 is determined for caller 110, for example, by using Calling Line Identification (CLID), Calling Number Identification (CNID), Automatic Number Identification (ANI), a Line Identification Database (LID), or any suitable method for providing an identification of the caller 110 or the calling device 120. Alternatively the caller 110 may be asked by the contact center system 130 or the agent 180 to provide or input the caller or calling device identifier 150. In some embodiments, the contact center system 130 may query the calling device 120 directly to determine the calling device identifier 150. The caller or calling device identifier 150 can be used to retrieve communications among the caller 110, the business system 190 and the contact center system 130, stored in the shared communication gateway 170, and to provide the communications to the agent 180. The shared communication gateway 170 operates to provide a gateway for the calling device 120 to the business system 190 and the contact center system 130, such that communications exchanged between the calling device 120 and the business system 190, and exchanged between the calling device 120 and the contact center system 130, are routed through, and stored in, the shared communication gateway 170.

The shard communication gateway 170 provides the agent 180 with the ability to retrieve a full history of communications to and from a particular caller from the shared communication gateway 170, including any communications to or from the business system 190 and to and from the contact center system 130. In one example, the full communication history is displayed to the agent 180 on a screen, using, for example, a screen pop up or other type of API viewable by the agent 180. The screen pop up or API may be initiated by the entry of the caller or calling device identifier 150. The automatic application of the caller or calling device identifier 150 may be based on the contact center's call manager providing the CLID, CNID, ANI, LID, or other caller or calling device identification to the screen pop up application.

Figure 2:
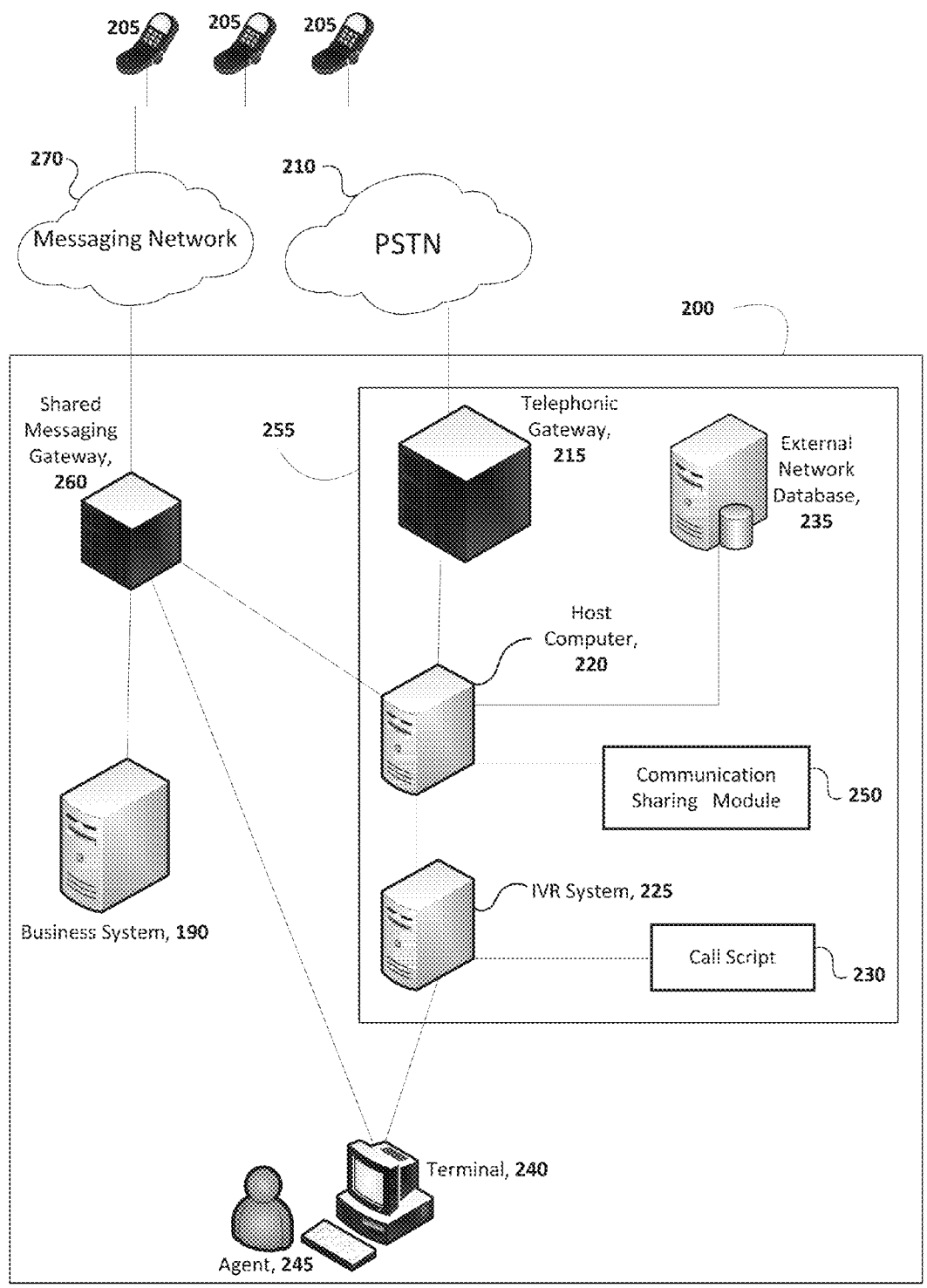
FIG. 2 shows a schematic illustration of an exemplary system configured for communication sharing according to the disclosed embodiments.

As a further illustration, FIG. 2 schematically shows an exemplary communication system 200, including business system 190 and a contact center system 255. The contact center system 255 may include a host computer 220 (or multiple host computers) communicatively coupled to different calling devices 205, for example cellphones or softphones over a PSTN 210 by way of a telephonic gateway 215. The host computer 220 can support the operations of an IVR system 225. The operations may include conducting a request/response session with different callers at the different calling devices 205 utilizing a call flow defined within a call script 230 such as a Voice Extensible Markup Language (VXML) defined call script. The communication system 200 may include a shared messaging gateway 260 shared between the business system 190 and the contact center system 255 from which communications among the calling devices 205, the business system 190 and the contact center system 255 may be obtained. The shared messaging gateway 260 operates such that messaging communications exchanged between a calling device 205 and the business system 190, and exchanged between the calling device 205 and the host computer 220, are routed through, and stored in, the shared messaging gateway 260. In at least one aspect of the disclosed embodiments, the shared messaging gateway 260 may be resident within the contact center system 255, resident within the IVR data processing system 225, or may be provided as a service to either the contact center system 255 or the IVR data processing system 225, for example as web service or a cloud based service provided by another business entity.

A communication sharing module 250 can be coupled to the host computer 220. The communication sharing module 250 can include program code enabled to perform the communication sharing among the calling devices 205, the business system 190, and the communication system 225. The program code can further be enabled to check the identity of the calling device 205 and to verify that the calling device 205 may be capable of other types of communication in addition to voice communication, for example Short Message Service (SMS) text messaging, by using an External Network Database 235. The program code can also be enabled to pre-address communications between the calling devices 205 and the business system 190 or the contact center system 255 based on the CLID, CNID, ANI, LID, or any suitable identification. Further, the program code can be enabled to retrieve the full history of communications among the calling devices 205, the business system 190, and the contact center system 255, and to provide the history to an agent terminal 240.

Figure 3:
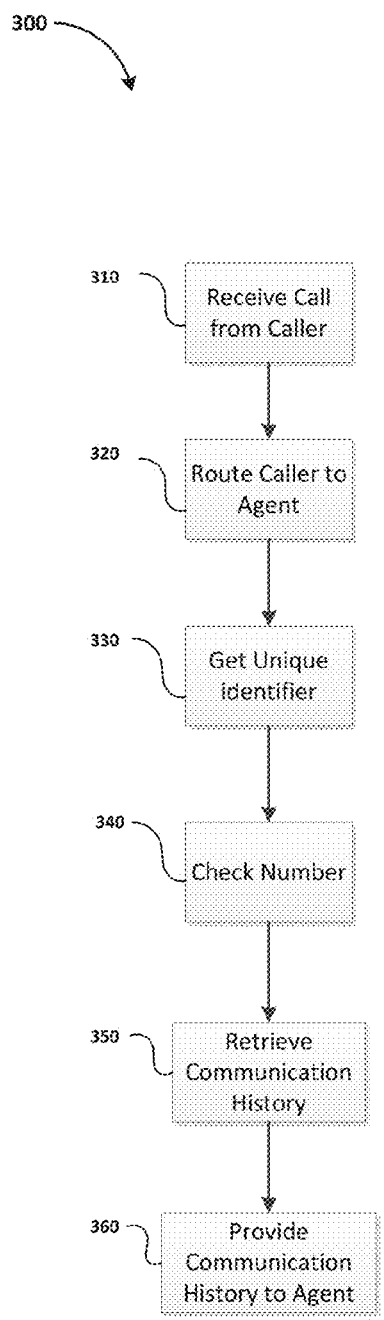
FIG. 3 shows a flow chart illustrating an exemplary process for communication sharing according to the disclosed embodiments.

FIG. 3 shows a flow chart 300 illustrating a process for communication sharing in communication system 200. Beginning in block 310, a call can be received by the contact center system 255 from calling device 205. In block 320 the call may be routed to an agent 245. A caller or calling device unique identifier 150 such as the caller's telephone number, CLID, CNID, ANI, LID, or other caller or calling device identification is automatically obtained in block 330 if it is available. In some embodiments, the contact center system 255 may query the calling device 205 directly to determine the calling device unique identifier 150. If the unique identifier 150 is not available, the caller may be prompted to provide the unique identifier 150. Once the identifier has been obtained, in block 340 a call to the External Network Database 235 is effected to check the validity of the unique identifier. If the unique identifier is valid, in block 350, the communication history for the unique identifier is obtained from the shared messaging gateway 260. In block 360, the communication history may be provided to the agent 245.

Figure 4:
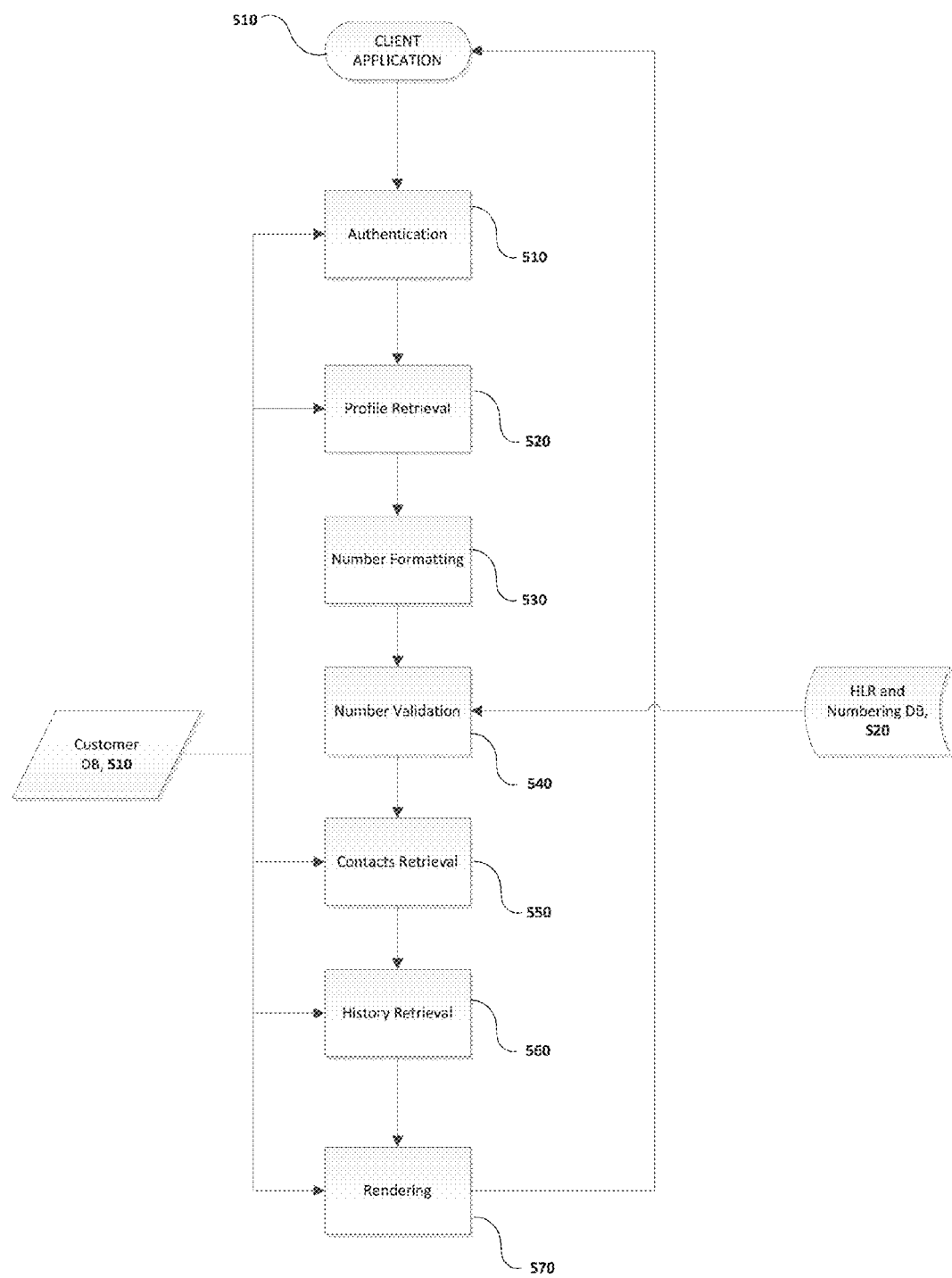
FIG. 4 shows a flow chart illustrating another exemplary process for communication sharing according to the disclosed embodiments.

The disclosed embodiments may be implemented as a client application residing on any of the components of the contact center system 255, for example, the host computer 220, IVR system 225, or any other suitable component. As illustrated in FIG. 4, a request may be made by a client application 500 for information related to communication capabilities, for example, SMS functionality, related to a particular telephone number or unique identifier. The client may be resident, for example, on an agent terminal 240 (FIG. 2). The unique identifier may be entered manually, by the agent 500, or may be passed automatically by a system in use by said agent, an example being a call processing or other system which passes a caller's caller line identification, CLID, CNID, ANI, LID, or other caller or calling device identification, in place of the manual entry mentioned above. In some embodiments, the client application 500 may cause the calling device 205 to be queried directly to determine the information related to the communication capabilities. The automatic passing of the unique identifier based on a phone call from a caller allows communications, for example, SMS text messages to be preaddressed without the need for manual entry by the agent or the caller.

Client application 500 may call for the SMS functionality, using HTTP(S) or another protocol to access the hosted SMS solution. When calling the system, values may be passed related to authentication, telephone number and additional variables such as agent id or other custom fields or other suitable information that may be required by client application 500. The passed authentication credentials may be validated by a process 510, and may draw on information from a customer database as shown in block S10. In at least one embodiment, database S10 may be implemented using external network database 235 (FIG. 2).

Once authenticated, a caller profile 520 may be retrieved from the system. Data related to this caller and communication facility, for example, the SMS facility requested, may be pulled form data store S10. Information retrieved may include, but is not restricted to, the valid numbering format for this customer, type of rendering required, for example, for presenting data, and the features to display. The phone number or unique identifier may be converted to a standard format, for example E.164 ITU format if required, as shown in block 530.

At block 540, a Number Validation Process may draw on resources including, but not restricted to, external home Location Register (HLR) data, number portability databases, and internal systems, to verify that the provided number has various communication capabilities, for example, SMS communication. Customer Database S10 may also be accessed by Contacts 550 and History 560 retrieval processes to compile data required when rendering the data to be returned to the client application, for example, for display to the agent. The History 560 of all messages sent to and from the unique identifier may be made available and visible to a user of the client application such as the agent, including messages that are sent from other systems or applications that are using the same shared gateway.

Data gathered in earlier steps 510, 520, 530, 540, 550 and 560 may be used when rendering the final returned data, which can be in a variety of formats including, but not restricted to, HyperText Markup Language (HTML), Java Script Object Notation (JSON), or Comma Separated Values (CSV). In the case of a visual return format, such as HyperText Transfer Protocol (HTTP), the rendering process may use Cascading Style Sheets (CSS) or similar styling components to most closely match the format and design of the calling client application.

Figure 5:
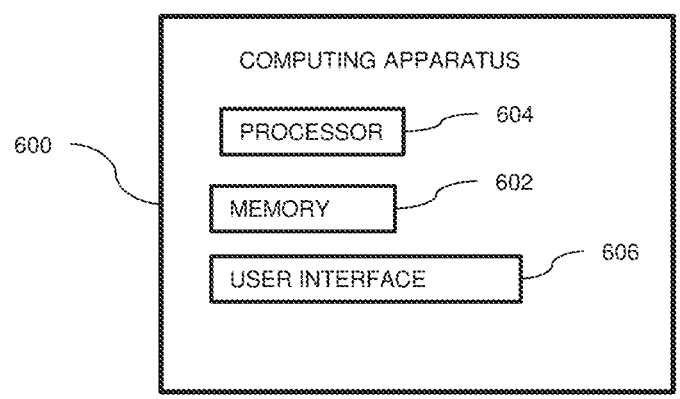
FIG. 5 shows a block diagram of an exemplary computing apparatus that may be used to practice aspects of the disclosed embodiments.

In at least one aspect of the disclosed embodiments, the systems and methods disclosed herein may be executed by one or more computers under the control of one or more programs stored on computer readable medium. FIG. 5 shows a block diagram of a computing apparatus 600 that may be used to practice aspects of the disclosed embodiment. In at least one exemplary aspect, the calling device 120, calling devices 205, contact center systems 130, 255, external network database 160, 235, telephonic gateway 215, host computer 220, IVR system 225, terminal 240, shared messaging gateway 260, communication sharing module 250, and other disclosed devices and systems may be implemented using an instance or replica of the computing apparatus 600 or may be combined or distributed among any number of instances or replicas of computing apparatus 600.

The computing apparatus 600 may include computer readable program code stored on at least one computer readable medium 602 for carrying out and executing the processes and methods described herein. The computer readable medium 602 may be a memory of the computing apparatus 600. In alternate aspects, the computer readable program code may be stored in a memory external to, or remote from, the apparatus 600. The memory may include magnetic media, semiconductor media, optical media, or any media which may be readable and executable by a computer. Computing apparatus 600 may also include a processor 604 for executing the computer readable program code stored on the at least one computer readable medium 602. In at least one aspect, computing apparatus may include one or more input or output devices, generally referred to as a user interface 606, for example, the user interface (UI) described above, which may operate to allow input to the computing apparatus 600 or to provide output from the computing apparatus 600, respectively. The user interface 606 may include a device display, touch screen, buttons, and audio input and output.

It is contemplated that when using the techniques and structures described herein, an agent may be capable of retrieving a history of communications for a caller in order to be able to provide comprehensive information to the caller.

It should be understood that the disclosed embodiments may take the form of an entirely hardware embodiment, an entirely software embodiment or an embodiment containing both hardware and software elements.

While the techniques and systems disclosed herein are described in the context of initiating communications over the Public Switched Telephone Network (PSTN), it should be understood that any suitable communication network may be used for initiating communications.

While the techniques and systems disclosed herein are described in the context of an IVR system, it should be understood that any system suitable for performing the described functions and operations may be used to implement the disclosed embodiments. Furthermore, while SMS messages are used exemplary communications being stored and retrieved, it should be understood that any communications may be used according to the disclosed embodiments.

In at least one aspect, the disclosed embodiments are directed to receiving a call, determining an identifier associated with a caller or calling device, and retrieving a history of communications related to the caller or calling device.

The invention claimed is:

1. A method for providing communication interaction visibility, comprising:
   detecting an incoming voice call communication from a calling device (120 205) to a communication system, wherein the communication system comprises a business system (190) and a contact center system (130 255), the contact center system (130 255) being arranged in association with the business system (190) but not facilitated direct access to the business system (190);
   determining an identifier (150) of a caller (110) initiating the voice call (120 205) communication;
   retrieving a communication history, comprising messaging communications exchanged between a calling device (120 205) and the business system (190) or contact center system (130 255) arranged as routed through a messaging gateway (170 260), the messaging gateway (170 260) being arranged cooperatively with the communication system, said communication history being related to the identifier and being retrieved from the messaging gateway (170 260); and
   providing the communication history to an agent terminal (180 240) of the communication system.

2. The method of claim 1, comprising determining the identifier (150) of the caller automatically.

3. The method of claim 2, wherein the identifier (150) is determined from one or more of a calling line identification, calling number identification, automatic number identification, or a line identification database.

4. The method of claim 1, wherein the messaging gateway (170 260) stores the communication history comprising communications related to the identifier exchanged between the caller (110) and the business system (190) and the contact center system (130 255) of the communication system.

5. The method of claim 1, further comprising routing the caller (110) to an agent (180 245) upon detecting the incoming voice call (120 205) communication.

6. The method of claim 5, comprising rendering the communication history for viewing by the agent (180 245).

7. The method of claim 1, wherein the communication history related to the identifier comprises text messages.

8. A computer program product comprising non-transitory computer program instructions that when executed by a processor cause the processor to perform the method according to claim 1.

9. The method of claim 1, wherein the communication history comprises the content of a plurality of emails and/or text messages.

10. A communication system for providing communication interaction visibility, comprising:
    a contact center system (130 255) for detecting an incoming voice call communication; and
    a communication sharing module (250) that is configured to:
    determine an identifier (150) of a caller (110) initiating the voice call (120 205) communication;
    retrieve a communication history, comprising messaging communications exchanged between a calling device (120 205) and a business system (190) or the contact center system (130 255) arranged as routed through a messaging gateway (170 260), the messaging gateway (170 260) being arranged cooperatively with the communications system and from which the communication history can be obtained, said communication history being related to the identifier being retrieved from the messaging gateway (170 260); and
    provide the communication history to an agent terminal (180 240) of the communication system.

11. The communication system of claim 10, wherein the communication sharing module (250) is configured to determine the identifier (150) of the caller automatically.

12. The communication system of claim 11, wherein the identifier (150) is determined from one or more of a calling line identification, calling number identification, automatic number identification, or a line identification database.

13. The communication system of claim 10, wherein the messaging gateway stores the communication history comprising communications related to the identifier exchanged between the caller and the contact center and the business system of the communication system.

14. The communication system of claim 10, wherein the contact center system (130 255) is configured to route the caller (110) to an agent (180 245) upon detecting the incoming voice call (120 205) communication.

15. The communication system of claim 14, wherein the communication sharing module (250) is configured to render the communication history for viewing by the agent (180 245).

16. The communication system of claim 10, wherein the communication history related to the identifier comprises text messages.

17. A messaging gateway (170 260), comprising a computing apparatus (600) for providing communication interaction visibility according to the method of claim 1, arranged cooperatively with a communication system comprising a business system (190) and a contact center system (130 255), the contact center system (130 250) being arranged in association with the business system (190) but not facilitated direct access to the business system (190),
    the messaging gateway (170 260) arranged to provide a gateway such that messaging communications exchanged between a calling device (120 205) and the business system (190) or contact center system (130 255) are routed through the messaging gateway (170 260) and stored as a communication history,
    wherein the messaging gateway (170 260) is further arranged in cooperation with an agent terminal (180 240) of the contact center system (130 255), for retrieval of the communication history from the messaging gateway (170 260) and provision of said communication history to the agent terminal (180 240) for use by an agent (180 245) on provision of an identifier (150) related to the calling device (120 205).

18. The messaging gateway (170 260) of claim 17, wherein the identifier (150) is arranged to be determined automatically.

19. The messaging gateway (170 260) of claim 18, wherein the identifier is determined from one or more of a calling line identification, calling number identification, automatic number identification, or a line identification database.

20. The messaging gateway (170 260) of claim 17, wherein the messaging gateway is arranged to store the communication history comprising communications related to the identifier exchanged between the caller and the contact center and a business system of the communication system.

21. The messaging gateway (170 260) of claim 17, wherein the contact center system is configured to route the caller to an agent upon detecting the incoming voice call communication.

22. The messaging gateway (170 260) of claim 17, wherein the caller is arranged to be routed to an agent upon detection of the incoming voice call (120 205).

23. The messaging gateway (170 260) of claim 17, wherein the communication history related to the identifier comprises text messages.

24. The messaging gateway (170 260) as claimed in claim 17, wherein the messaging gateway (170 260) is arranged as resident within the contact center system (225).

25. The messaging gateway (170 260) as claimed in claim 24, wherein the messaging gateway further comprises a communication sharing module (250) coupled to a host computer (220) of the contact center system (130 255).

26. The messaging gateway (260) as claimed in claim 25, wherein the communication sharing module (250) is arranged to:
   determine an identifier (150) of a caller (110) initiating the voice call (120 205) communication;
   retrieve a communication history, comprising messaging communications exchanged between a calling device (120 205) and the business system (190) or contact center system (130 255) arranged as routed through a messaging gateway (170 260), said communication history being related to the identifier and being retrieved from the messaging gateway (170 260); and,
   provide the communication history to an agent terminal (180 240) of the communication system.

27. A communication system for providing communication interaction visibility, comprising:
   a messaging gateway (260), as claimed in claim 17.

28. The communication system of claim 27, wherein the identifier is determined automatically.

29. The communication system of claim 28, wherein the identifier is determined from one or more of a calling line identification, calling number identification, automatic number identification, or a line identification database.

30. The communication system of claim 27, wherein the messaging gateway stores the communication history comprising communications related to the identifier exchanged between the caller and the contact center and a business system of the communication system.

31. The communication system of claim 27, wherein the contact center system is configured to route the caller (110) to an agent (180 245) upon detecting the incoming voice call (120 205) communication.

32. The communication system of claim 27, wherein the communication sharing module is configured to render the communication history for viewing by the agent (180 245).

33. The communication system of claim 27, wherein the communication history related to the identifier comprises text messages.

34. The communication system as claimed in claim 27, wherein the messaging gateway is arranged as resident within the contact center system (225) and further comprises:
   a communication sharing module (250) that is configured to:
      determine an identifier (150) of a caller (110) initiating the voice call (120 205) communication;
      retrieve a communication history, comprising messaging communications exchanged between a calling device (120 205) and the business system (190) or contact center system (130 255) arranged as routed through a messaging gateway (170 260), said communication history being related to the identifier and being retrieved from the messaging gateway (170 260); and,
      provide the communication history to an agent terminal (180 240) of the communication system.

35. The communication system of claim 34, wherein the communication sharing module (250) is configured to determine the identifier of the caller automatically.

36. A method comprising:
   detecting an incoming voice call communication from a calling device to a communication system, wherein the communication system comprises a business system and a contact center system that communicate through a communication channel that is routed through a messaging gateway logically coupled between the business system and the contact center system;
   determining an identifier of the calling device initiating the voice call communication;
   retrieving a communication history via the communication channel, wherein the communication history comprises content of a plurality of emails and/or text messages exchanged between the calling device and the business system and/or the contact center system, the communication history being related to the identifier and being retrieved from the messaging gateway; and
   providing the communication history to an agent terminal of the communication system.

\* \* \* \* \*